(12) United States Patent
Enriquez

(10) Patent No.: US 12,162,552 B2
(45) Date of Patent: Dec. 10, 2024

(54) LOCKING CLAMP FOR SECURING A BICYCLE SEAT POST TO A BICYCLE FRAME

(71) Applicant: Jesus R. Enriquez, Bisbee, AZ (US)

(72) Inventor: Jesus R. Enriquez, Bisbee, AZ (US)

( * ) Notice: Subject to any disclaimer, the term of this patent is extended or adjusted under 35 U.S.C. 154(b) by 208 days.

(21) Appl. No.: 17/817,948

(22) Filed: Aug. 5, 2022

(65) Prior Publication Data

US 2023/0040258 A1 Feb. 9, 2023

Related U.S. Application Data

(60) Provisional application No. 63/230,575, filed on Aug. 6, 2021.

(51) Int. Cl.
*B62H 5/00* (2006.01)
*B62K 19/36* (2006.01)
*E05B 37/02* (2006.01)

(52) U.S. Cl.
CPC .............. *B62H 5/006* (2013.01); *B62K 19/36* (2013.01); *E05B 37/02* (2013.01)

(58) Field of Classification Search
CPC .......... E05B 37/00; E05B 37/02; E05B 37/04; B62H 5/00; B62H 5/006; B62K 19/00; B62K 19/30; B62K 19/36

USPC .......................................................... 70/233
See application file for complete search history.

(56) References Cited

U.S. PATENT DOCUMENTS

| 4,079,872 A * | 3/1978 | Halter | B62J 9/27 224/418 |
| 2020/0369337 A1* | 11/2020 | Tisue | B62K 19/36 |

FOREIGN PATENT DOCUMENTS

| ES | 1071738 U * | 3/2010 | B62H 5/001 |
| ES | 2586753 A1 * | 10/2016 | B62H 5/006 |

* cited by examiner

*Primary Examiner* — Nathan Cumar
(74) *Attorney, Agent, or Firm* — NGUYEN TARBET IP LAW

(57) ABSTRACT

The present invention features a locking clamp capable of securing a post into a bicycle frame such that only a user can remove the locking clamp. The locking clamp may comprise a lock capable of accepting an unlocking method that only the user may utilize, ensuring security of the post to protect items stored in the post (e.g. a bicycle repair assembly). The unlocking method may depend on the type of lock implemented. The locking clamp may further comprise a first jaw extending from the lock, a second jaw extending from the lock, and a screw connecting the first jaw and the second jaw. Actuating the screw may move the first jaw closer to the second jaw thus tightening the locking clamp around an interface of the post and the bicycle frame.

13 Claims, 6 Drawing Sheets

LOCKING CLAMP FOR SECURING A BICYCLE SEAT POST TO A BICYCLE FRAME

CROSS-REFERENCES TO RELATED APPLICATIONS

This application is a non-provisional and claims benefit of U.S. Provisional Application No. 63/230,575 filed Aug. 6, 2021, the specification(s) of which is/are incorporated herein in their entirety by reference.

FIELD OF THE INVENTION

The present invention relates to a locking clamp for securing a bicycle repair assembly to a bicycle frame.

BACKGROUND OF THE INVENTION

Cycling is a popular form of transport, exercise, recreation, and sport. One problem of riding a bicycle is the common occurrence of a flat bicycle tire. Repair of the flat bike tire is inconvenient, especially when the flat bike tire occurs during a ride. A bicycle rider typically carries a tire repair kit having a tire pump, tire tools, and a tire patch. The tire repair kit may be carried by the rider or attached to the bike frame, which adds bulk and weight to the bicycle. Moreover, the use of the tire pump to inflate a bike tire is both time consuming and exhausting. One would need to exert a lot of energy to pump the tire to the proper tire pressure, which may be as high as 130 psi for road bike tires. Since the tire pump is usually mounted to the bicycle frame, the tire pump could be stolen or accidentally detached and lost during a ride.

One alternative to the tire pump is to use a high-pressure gas cartridge, such as a $CO_2$ cartridge, to inflate the flat tire. These gas cartridges are small and convenient to carry during a ride, and significantly reduce inflation time and effort. However, these gas cartridges would still need to be carried in the bulky tire repair kit. Hence, there is a need for a bicycle repair system that is convenient for transport and can efficiently inflate a flat bike tire.

These bicycle repair systems, while useful, can be difficult to easily transport. Prior systems may incorporate these repair systems into a bicycle seat post and disposed in a bicycle frame. However, this requires that a bicycle repair system be included with every bicycle in order to actually use and transport it efficiently. Prior systems may implement a compression assembly to attach the bicycle repair assembly to the bicycle seat post.

This placement of the bicycle repair assembly can make the tool extremely susceptible to being taken by anyone passing by. Prior systems exist to secure a bicycle seat post to a bicycle frame with a simple clamp, but this would only require a passerby to open up the clamp and take the bicycle repair assembly. Thus, there exists a present need for a locking clamp that can secure a bicycle repair assembly attached to a bicycle seat post to a bicycle frame capable of locking in a manner that can only be opened by the user.

BRIEF SUMMARY OF THE INVENTION

It is an objective of the present invention to provide a device that allows for a locking clamp for securing a bicycle repair assembly to a bicycle frame, as specified in the independent claims. Embodiments of the invention are given in the dependent claims. Embodiments of the present invention can be freely combined with each other if they are not mutually exclusive.

In some aspects, the present invention features a locking clamp capable of securing a post into a bicycle frame such that only a user can remove the locking clamp. In some embodiments, the locking clamp may comprise a lock capable of accepting an unlocking method that only the user may utilize, ensuring security of the post to protect items stored in the post (e.g. a bicycle repair assembly). The unlocking method may depend on the type of lock implemented. The locking clamp may further comprise a first jaw extending from the lock, a second jaw extending from the lock, and a screw connecting the first jaw and the second jaw. Actuating the screw may move the first jaw closer to the second jaw thus tightening the locking clamp around the post. The locking clamp may be disposed at an interface of the post and the bicycle frame.

One of the unique and inventive technical features of the present invention is the implementation of a secure lock to prevent unwanted removal of a bicycle seat post from a bicycle frame. Without wishing to limit the invention to any theory or mechanism, it is believed that the technical feature of the present invention advantageously provides for the protection of a bicycle repair assembly disposed in line with a bicycle seat post, preventing removal of the bicycle repair assembly by anyone other than a registered user. None of the presently known prior references or work has the unique inventive technical feature of the present invention.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE SEVERAL VIEWS OF THE DRAWING(S)

The features and advantages of the present invention will become apparent from a consideration of the following detailed description presented in connection with the accompanying drawings in which.

DETAILED DESCRIPTION OF THE INVENTION

Figure 1A:
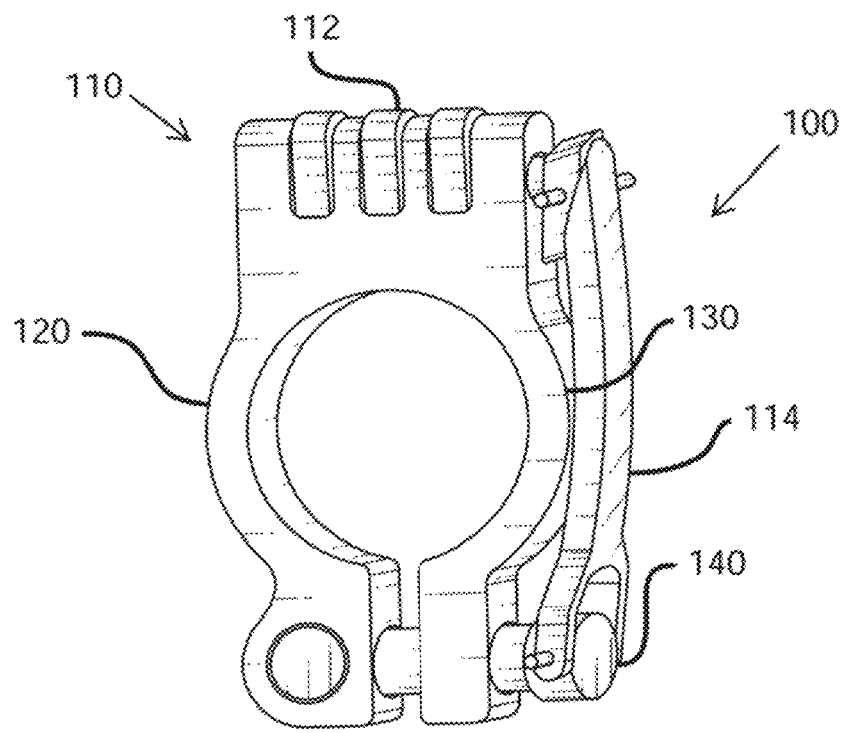
FIG. 1A shows a non-limiting embodiment of a locking clamp of the present invention.
Figure 1B:
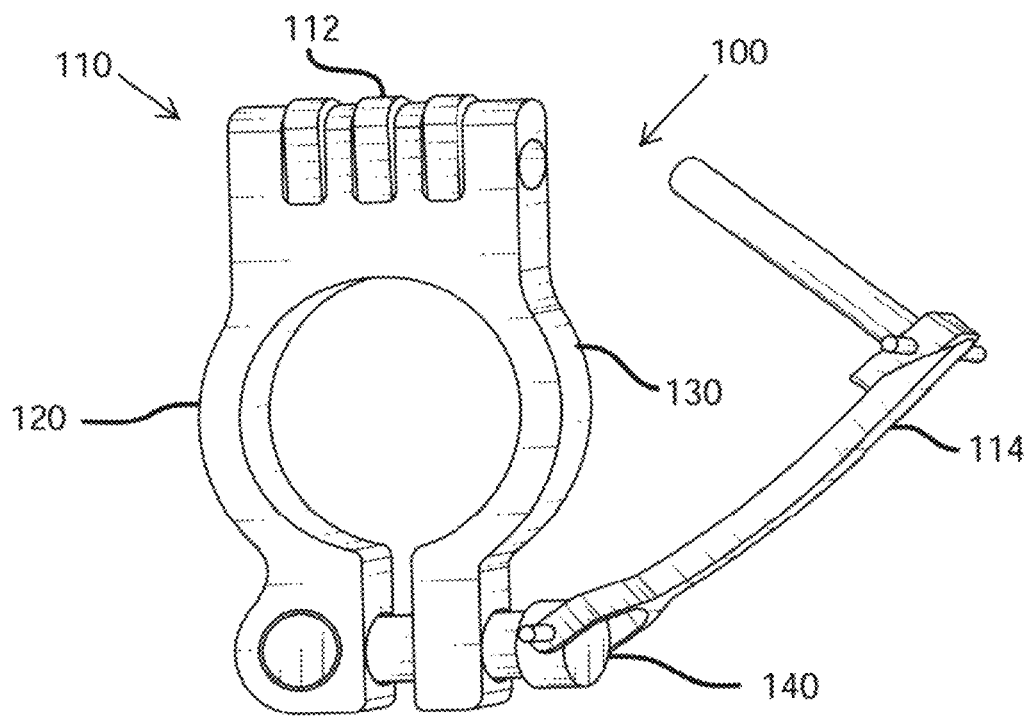
FIG. 1B shows a front view of an unlocked locking clamp.
Figure 1C:
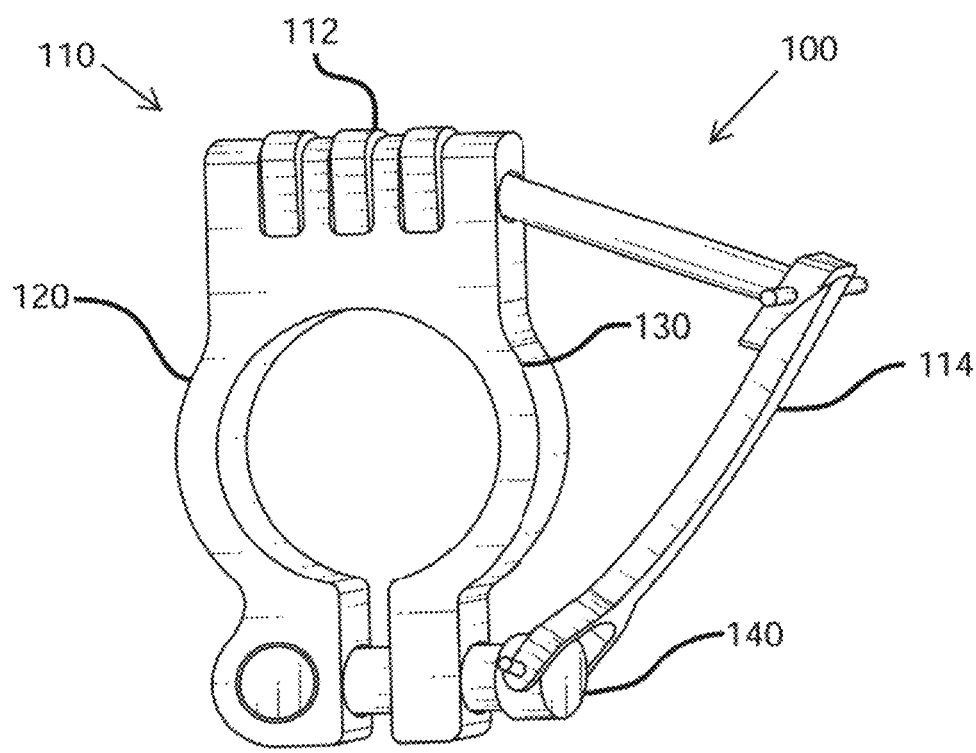
FIG. 1C shows a front view of a locking clamp in the process of being unlocked.
Figure 1D:
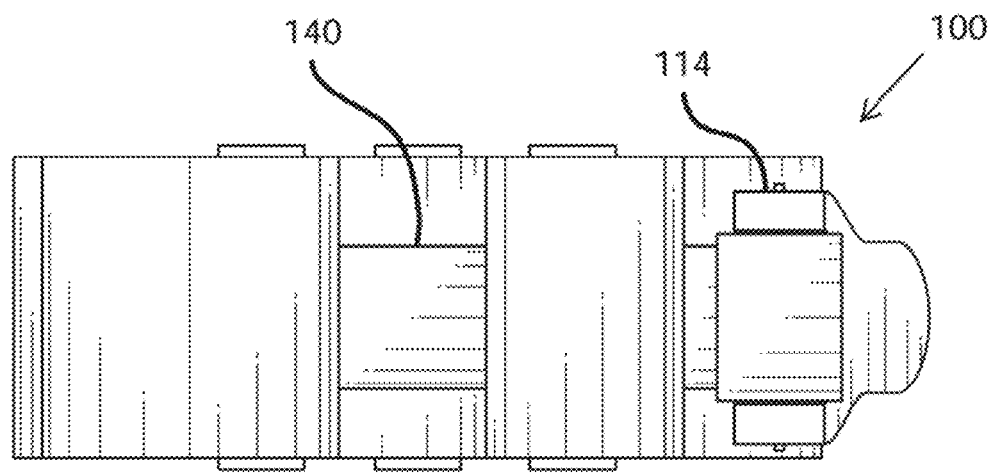
FIG. 1D shows a first side view of the locking clamp.
Figure 1E:
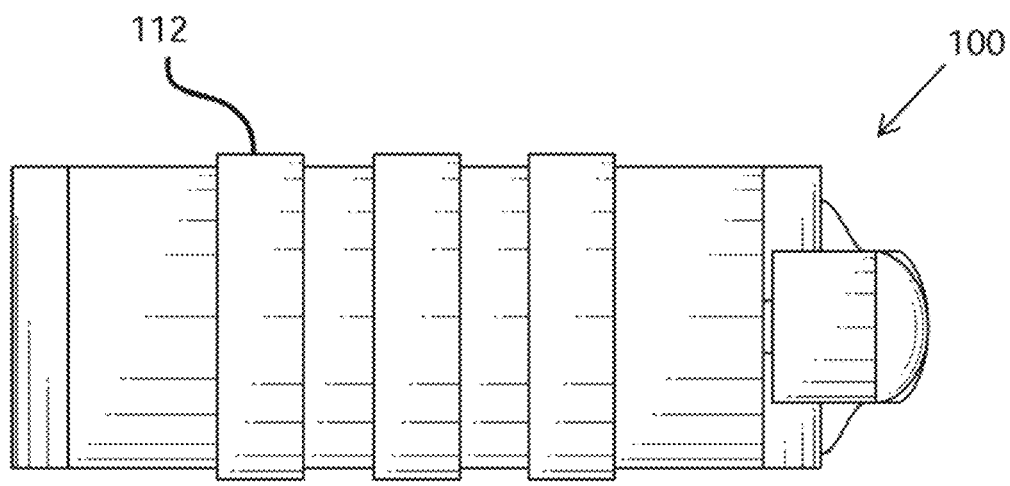
FIG. 1E shows a second side view of the locking clamp.
Figure 1F:
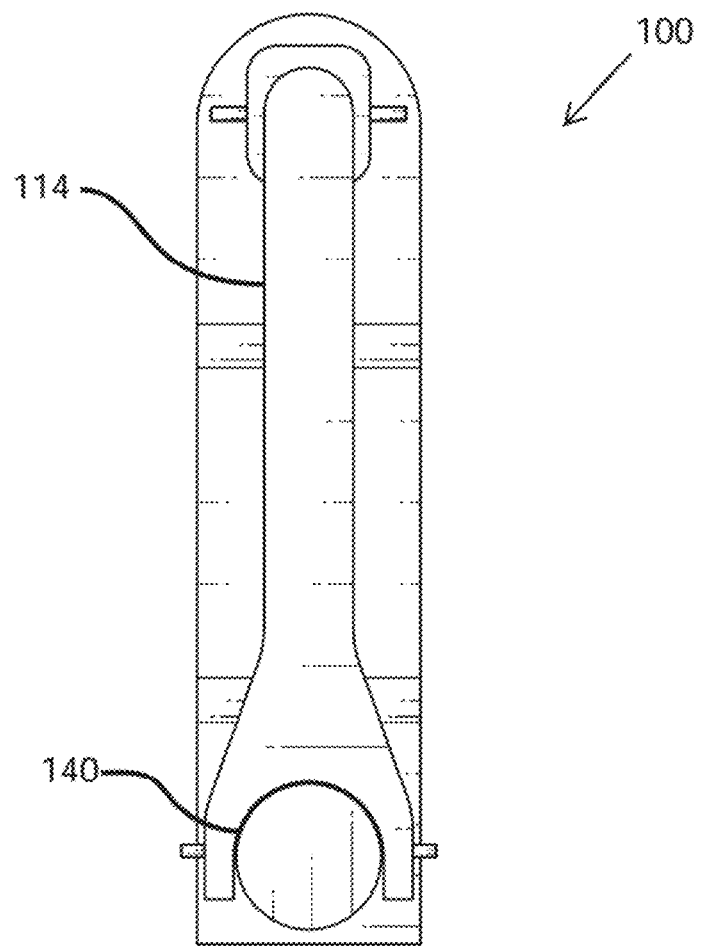
FIG. 1F shows a top view of the locking clamp.
Figure 2:
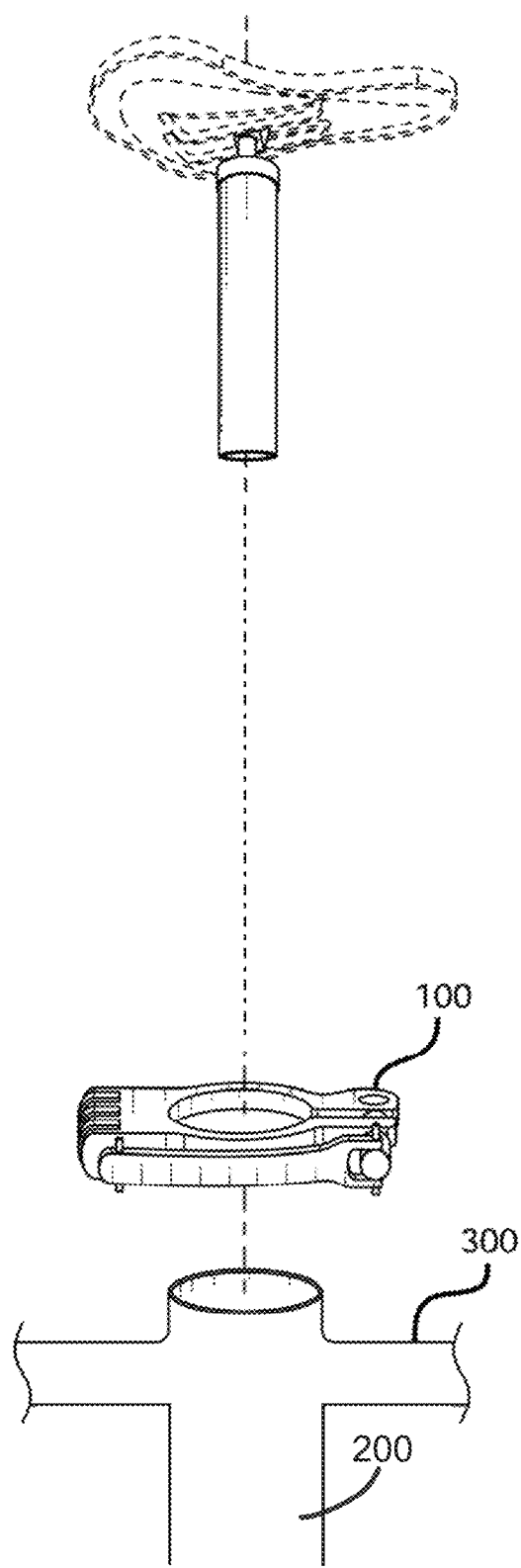
FIG. 2 shows a system comprising a post and a bicycle frame such that the post is secured to the bicycle frame by the locking clamp of the present invention.

Following is a list of elements corresponding to a particular element referred to herein:

100 locking clamp
112 locking mechanism
113 lock arm
114 shackle
120 first jaw
130 second jaw
140 screw
200 post
300 bicycle frame Referring now to FIGS. 1A-1F, in some embodiments, the present invention features a locking clamp (100) capable of securing a post (200) into a bicycle frame (300) such that only a user can remove the locking clamp (100). In some embodiments, the locking clamp (100) may comprise a lock (110) comprising a locking mechanism (112) and a shackle (114). The lock (110) may be capable of accepting an unlocking method to remove the shackle (114) from the locking mechanism (112). Only the user may utilize the unlocking method, ensuring security of the post to protect items stored in the post (e.g. a bicycle repair assembly). The unlocking method may depend on the type of lock implemented. The locking clamp (100) may further comprise a first jaw (120) extending from the lock (110), a second jaw (130) extending from the lock (110), and a screw (140) connecting the first jaw (120) and the second jaw (130). Actuating the screw (140) may move the first jaw (120) closer to the second jaw (130) thus tightening the locking clamp (100) around the post (200). The locking clamp (100) may be disposed at an interface of the post (200) and the bicycle frame (300), as shown in FIG. 2.

In some embodiments, the locking clamp (100) may be used in a method to secure a post (200) into a bicycle frame (300). The method may comprise providing the locking clamp (100), placing the locking clamp (100) at the interface of the post (200) and the bicycle frame (300), actuating the screw (140) to tighten the locking clamp (100) around the post (200), and locking the shackle (114) to the locking mechanism (112).

Figure 3A:
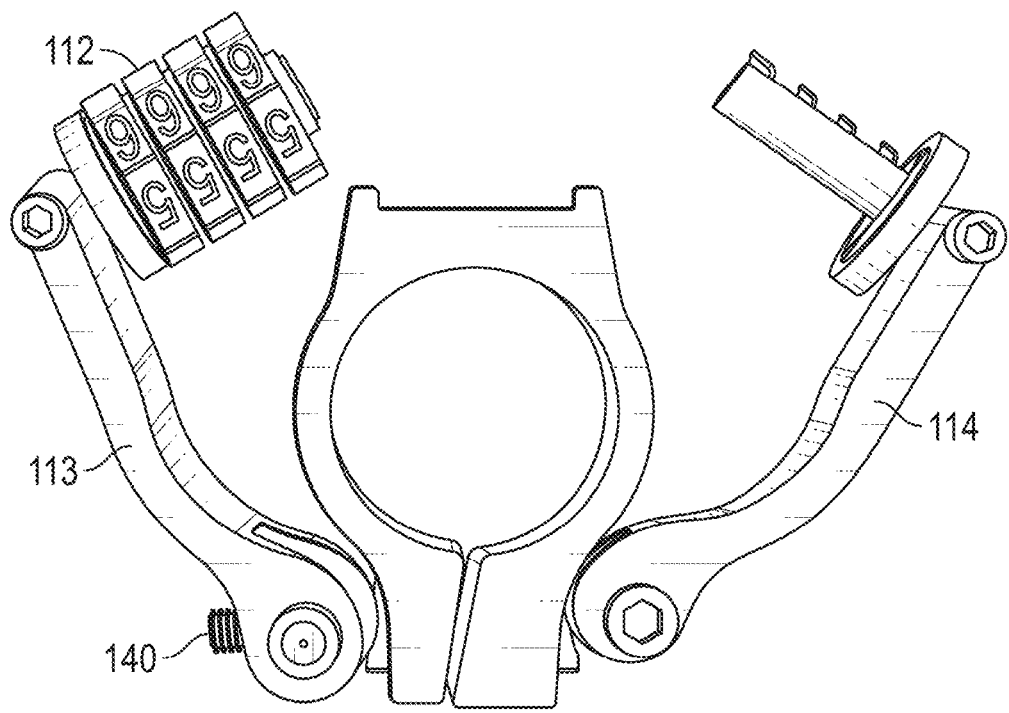
FIG. 3A shows a front view of another embodiment of the locking clamp in the unlocked configuration.
Figure 3B:
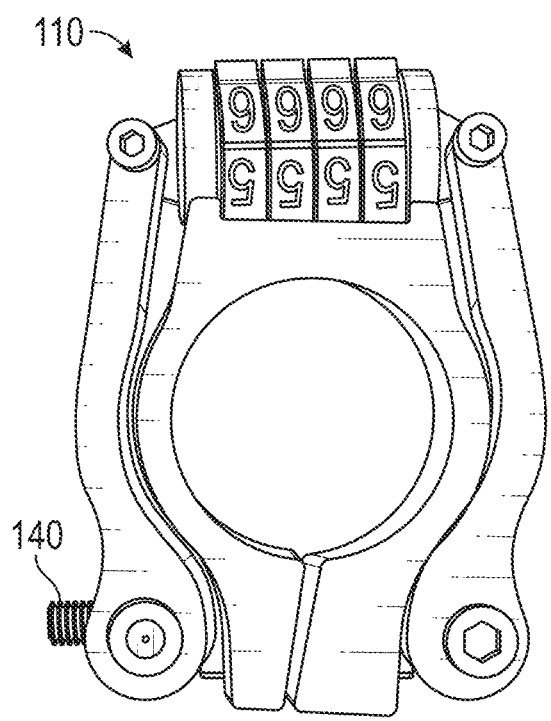
FIG. 3B is a front view of the locking clamp in the locked configuration.

Referring to FIGS. 3A-3B, the present invention features another embodiment of the locking clamp (100). The locking clamp (100) may comprise a post clamp configured to wrap around an interface of the post (200) and the bicycle frame (300). The post clamp may comprise a first jaw (120) and a second jaw (130). The locking clamp (100) further comprises a screw (140) connecting the first jaw (120) to the second jaw (130), a lock arm (113) coupled to one end of the screw (140), wherein the lock arm (113) has a locking mechanism (112) attached to a distal end of the lock arm (113), and a shackle (114) coupled to an opposing end of the screw (140), wherein the shackle (114) is configured to be locked to the locking mechanism or unlocked from the locking mechanism (112). In some embodiments, actuating the screw (140) moves the first jaw (120) and the second jaw (130) closer to each other, thus tightening the post clamp (100) around the interface. In some embodiments, when the shackle (114) is locked to the locking mechanism, the lock arm (113) and the shackle (114) wrap around the post clamp, thus securing the post (200) into the bicycle frame (300).

In one embodiment, the lock arm (113) is pivotably coupled to the screw (140). In another embodiment, the shackle (114) is pivotably coupled to the screw (140).

The locking clamp (100) in the embodiment shown in FIGS. 3A-3B may be used in a method of securing the post (200) into the bicycle frame (300). The method may comprise providing said locking clamp (100), wrapping the post clamp around the interface of the post (200) and the bicycle frame (300), actuating the screw (140) to move the first jaw (120) and the second jaw (130) closer to each other, thus tightening the post clamp (100) around the interface, and locking the shackle (114) to the locking mechanism (112) such that the lock arm (113) and the shackle (114) wrap around the post clamp.

Figure 4:
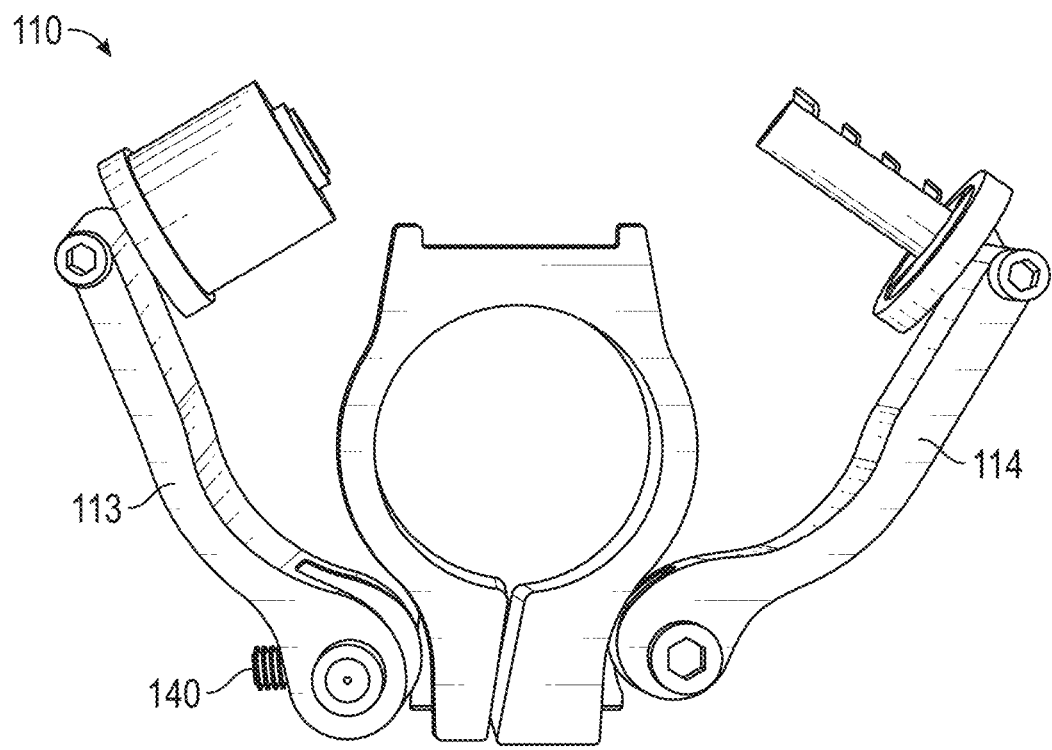
FIG. 4 shows a front view of another embodiment of the locking clamp in the unlocked configuration.

In conjunction with any of the embodiments described herein, the locking mechanism (112) may comprise a combination lock and the unlocking method may comprise entering a pre-registered combination. In other embodiments, as shown in FIG. 4, the locking mechanism (112) may comprise a keyhole lock and a corresponding key. The unlocking method may comprise inserting the corresponding key into the keyhole lock to unlock the locking mechanism (112).

In conjunction with any of the embodiments described herein, the post (200) may comprise a bicycle repair assembly. In some embodiments, the bicycle repair assembly is disposed inside an interior compartment of the post. In other embodiments, the post (200) may comprise a bicycle seat post.

In conjunction with any of the embodiments described herein, a material of the locking clamp (100) may comprise one or more metals. For example, the material of the locking clamp (100) may be aluminum, brass, chrome, steel, nickel, or alloys of those metals.

In conjunction with any of the embodiments described herein, an actuation method of the screw (140) may comprise twisting the screw (140). The locking clamp (100) may be re-locked from an unlocked state by moving or inserting the shackle (114) back into the locking mechanism (112). Some types of locks may require additional action to re-lock the locking clamp (100). For example, a combination lock can have a non-unlocking code entered while the shackle is disposed in the locking mechanism.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting essentially of" or "consisting of", and as such the written description requirement for claiming one or more embodiments of the present invention using the phrase "consisting essentially of" or "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A locking clamp (100) capable of securing a post (200) into a bicycle frame (300) such that only a user can remove the locking clamp (100), the locking clamp (100) comprising:
   a. a lock (110) comprising:
      i. a lock arm (113) comprising a locking mechanism (112) attached to a distal end of the lock arm (113); and ii. a shackle (114) capable of accepting an unlocking method to remove the shackle (114) from the locking mechanism (112), wherein only the user may utilize the unlocking method;
b. a first jaw (120) extending from the lock (110);
c. a second jaw (130) extending from the lock (110); and
d. a screw (140) connecting the first jaw (120) and the second jaw (130), wherein actuating the screw (140) moves the first jaw (120) closer to the second jaw (130) thus tightening the locking clamp (100) around the post (200);
   wherein the lock arm (113) is directly and pivotably coupled to the screw (140);
   wherein the shackle (114) is pivotably coupled to the screw (140);
   wherein the locking clamp (100) is disposed at an interface of the post (200) and the bicycle frame (300).

2. The locking clamp (100) of claim 1, wherein the lock (110) comprises a combination lock, wherein the unlocking method comprises entering a pre-registered combination.

3. The locking clamp (100) of claim 1, wherein the lock (110) comprises a keyhole lock, wherein the unlocking method comprises inserting a corresponding key into the keyhole lock.

4. The locking clamp (100) of claim 1, wherein the post (200) comprises a bicycle seat post.

5. The locking clamp (100) of claim 1, wherein a material of the locking clamp (100) comprises one or more metals.

6. The locking clamp (100) of claim 1, wherein an actuation method of the screw (140) comprises twisting the screw (140).

7. A method of securing a post (200) into a bicycle frame (300), the method comprising:
   a. providing a locking clamp (100) according to claim 1;
   b. placing the locking clamp (100) at the interface of the post (200) and the bicycle frame (300);
   c. actuating the screw (140) to tighten the locking clamp (100) around the post (200); and
   d. locking the shackle (114) to the locking mechanism (112).

8. A locking clamp (100) capable of securing a post (200) into a bicycle frame (300), the locking clamp (100) comprising:

a. a post clamp configured to wrap around an interface of the post (200) and the bicycle frame (300), the post clamp comprising a first jaw (120) and a second jaw (130);
b. a screw (140) connecting the first jaw (120) to the second jaw (130), wherein actuating the screw (140) moves the first jaw (120) and the second jaw (130) closer to each other, thus tightening the post clamp (100) around the interface;
c. a lock arm (113) directly and pivotably coupled to one end of the screw (140), wherein the lock arm (113) has a locking mechanism (112) attached to a distal end of the lock arm (113); and
d. a shackle (114) pivotably coupled to an opposing end of the screw (140), wherein the shackle (114) is configured to be locked to the locking mechanism or unlocked from the locking mechanism (112);
   wherein when the shackle (114) is locked to the locking mechanism, the lock arm (113) and the shackle (114) wrap around the post clamp, thus securing the post (200) into the bicycle frame (300).

9. The locking clamp (100) of claim 8, wherein the locking mechanism (112) comprises a combination lock.

10. The locking clamp (100) of claim 8, wherein the post (200) comprises a bicycle seat post.

11. The locking clamp (100) of claim 8, wherein a material of the locking clamp (100) comprises one or more metals.

12. The locking clamp (100) of claim 8, wherein an actuation method of the screw (140) comprises twisting the screw (140).

13. A method of securing a post (200) into a bicycle frame (300), the method comprising:
   a. providing a locking clamp (100) according to claim 8;
   b. wrapping the post clamp around the interface of the post (200) and the bicycle frame (300);
   c. actuating the screw (140) to move the first jaw (120) and the second jaw (130) closer to each other, thus tightening the post clamp (100) around the interface; and
   d. locking the shackle (114) to the locking mechanism (112) such that the lock arm (113) and the shackle (114) wrap around the post clamp.

\* \* \* \* \*